(12) United States Patent
Wells et al.

(10) Patent No.: US 8,131,593 B1
(45) Date of Patent: Mar. 6, 2012

(54) SYSTEM AND METHOD FOR AUTOMATED PROPOSAL EVALUATION

(75) Inventors: Mayda Ann Wells, Colleyville, TX (US); Jay Pearson, Arlington, TX (US); James A. Hering, Lewisville, TX (US)

(73) Assignee: American Airlines, Inc., Fort Worth, TX (US)

( * ) Notice: Subject to any disclaimer, the term of this patent is extended or adjusted under 35 U.S.C. 154(b) by 2359 days.

(21) Appl. No.: 10/894,487

(22) Filed: Jul. 20, 2004

(51) Int. Cl.
*G06Q 30/00* (2006.01)
*G05B 19/418* (2006.01)

(52) U.S. Cl. ............ 705/14.5; 705/1; 705/50; 705/51

(58) Field of Classification Search .......... 705/14, 705/1, 50, 51
See application file for complete search history.

(56) References Cited

U.S. PATENT DOCUMENTS

| | | | |
|---|---|---|---|
| 6,937,996 B1 * | 8/2005 | Forsythe et al. ............... 705/16 |
| 7,162,429 B1 * | 1/2007 | Delgado et al. ............... 705/1.1 |
| 2003/0093361 A1 * | 5/2003 | Yoshida et al. ............... 705/37 |
| 2003/0163375 A1 * | 8/2003 | Dombrowski et al. ......... 705/14 |
| 2004/0103024 A1 * | 5/2004 | Patel et al. .................... 705/14 |
| 2005/0125354 A1 * | 6/2005 | Pisaris-Henderson et al. . 705/52 |

OTHER PUBLICATIONS

Researches Look to trawl the Net. Fowler David. Feb. 2001. Sports Marketing. This article discloses how the internet is valuable for access the latest news on sport events and sponsorship deals.*

* cited by examiner

*Primary Examiner* — John Weiss
*Assistant Examiner* — Victoria Vanderhorst
(74) *Attorney, Agent, or Firm* — Winstead P.C.

(57) ABSTRACT

A computer based method for automated submission and evaluation of business proposals by providing a database mutually accessible to a proposal sponsor and at least one requesting user community, communicating with the user community and interactively requesting one or more media or promotional elements for evaluation, populating the database with one or more received media or promotional elements, calculating a proposal sponsor payment value based upon received media or promotional elements according to schema provided by the proposal sponsor, comparing the calculated proposal sponsor payment value of with at least one proposal recommendation threshold value, and associating the comparison result with a proposal decision conclusion selected from one of the group of conclusions including, recommended, not recommended, and additional information required.

19 Claims, 2 Drawing Sheets

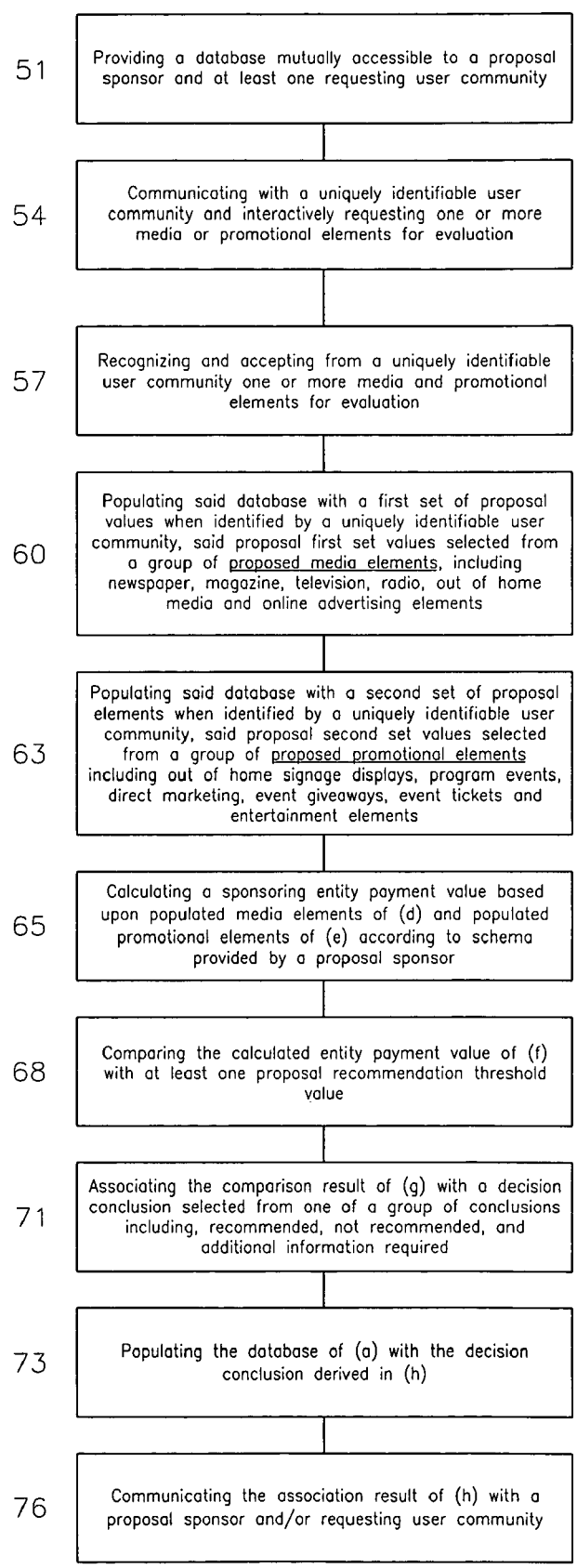

SYSTEM AND METHOD FOR AUTOMATED PROPOSAL EVALUATION

REFERENCE TO PENDING APPLICATIONS

This application is not related to any pending application.

REFERENCE TO MICROFICHE APPENDIX

This application is not referenced in any microfiche appendix.

FIELD OF INVENTION

The present invention relates generally to automated evaluation of third party request and more specifically to a computer based method for automation submission and evaluation of promotional and sponsorship requests.

BACKGROUND OF THE INVENTION

Business entities, most particularly large corporate entities, receive numerous promotional and sponsorship requests from third party organizations and charities each year. Typically, such corporations attempt to respond to these requests for a variety of reasons including common courtesy, laying the groundwork for a business opportunity the corporation's desire to support selected causes and a duty of corporate citizenship, most typically associated with a display of community involvement on the part of the corporation.

Unfortunately, only about 20% of promotional and sponsorship requests made of corporations each year are suitably presented to a corporation by a user community and out of that 20% only 10% of such requests are found actionable. In order to determine if a promotional sponsorship request warrants the time and attention of a corporation, the corporate entity must undertake an extensive and often time consuming evaluation. Prior to disclosure of the novel processing steps of the present invention, a corporation or other business entity would be required to review and evaluate each and every proposal so that each proposal may indeed be screened in terms of its appropriateness. Additional analysis in evaluating the type of value provided to the sponsoring corporation must be considered and often requires the employ of outside resources to complete this step in the evaluation. Follow-up contact is often required to seek additional information from the proposal organization, with negotiations and finalization of the approval process further requiring an administrator to consolidate all relevant information and agree upon the terms of the proposal. In short, the contemporary means for evaluating business/sponsorship proposals requires a lot of work and a great deal of time. Consequently, what is needed is an automated online evaluation process suitable for a plurality of requesting user communities and responding business entities.

SUMMARY OF INVENTION

In responding to the aforenoted deficiency, the instant invention provides a computer based method which improves the management evaluation and response to promotional and sponsorship solicitations. In so doing, the instant invention provides via an interactive computer based resource typically though not limited to, website graphic user interface (GUI) processing where submissions are centrally received, stored and accessed. The benefits and objectives of such an innovative computer based method are obvious for both proposal sponsors and the requesting user community.

For the requesting user community, submitting parties are provided with a tool that is easy to use and provides for a clear consistent process in which they might be apprised of what a business entity is looking for in a promotion. Further, one embodiment of the present invention contemplates, discloses and claims the providing of frequently asked questions to assist in the user's proposal construction. Additionally, the present invention provides for a means by which submitting parties can status a proposal and thus reduce calls or e-mails to the proposal sponsor. As used herein, the term proposal sponsor, business entity and responding corporation are used synonymously and interchangeably and relate to a business entity to which a proposal has been directed. The term submitter, user community, and user are also used synonymously and interchangeably and are intended to identify the party, parties or user community initiating a request to a business entity.

The business entity also derives benefit from the teachings of the instant invention in that it provides a means by which a centralized resource can be utilized to access and view all proposals, history of requests and construct a historical record of proposals. Of greater significance, however, is the streamlined process by which consistent evaluation elements can be used to derive value or benefit to the business entity, as a consequence of fulfilling a business proposal. Cost savings via the digital storing and communications capability the instant invention are thoroughly leveraged as is the minimizing of communication delay in the evaluation and statusing of proposals being entertained by the corporate entity.

The method of the instant invention relies upon directing submitters or requesting users to an online website that presents in a cogent manner proposal processing requirements including but not limited to a review of the guidelines for proposal submission, a registration of the user or user community and a submission of the proposal online. Once completed, the submitting party can check the status of proposals at any time and will receive one or more response from the business entity via an automated e-mail or other desired communication capability.

To streamline proposal submission information is generally categorized into the following classifications: basic contact information, a description of the proposal, dates relevant to the proposal's implementation, location, target audience, and lastly but most importantly, what is being requested in exchange for the proposed sponsorship. As an example, in the airline industry, tickets for airline travel is typically requested as are cash giveaways for selected events.

The business entity, however, in order to evaluate the potential for the proposal must request and analyze for media elements or promotional elements in order to evaluate the proposal effectively. In an embodiment of the present invention, media elements would include but not be limited to newspaper, magazine, TV, and radio advertisements as well as out of home and online media, while promotional elements would typically include but not be limited to media, event programs, and direct marketing initiatives. A business entity would typically also ask for event giveaway information such as advertising information, advertising brochures, promotional items as well as entertainment guest passes for event related promotional opportunities.

The simplified yet robust approach of the instant invention can best the conceptually viewed as a three-stage evaluation where in the first stage relates to the initial submission of the proposal and an initial filtering to quickly discount non-relevant proposals or proposals of a questionable nature with which the business entity does not desire to become associated. The second stage in the evaluation calls for an online calculation, or an evaluation of the elements provided by the submitting party. During this phase a notification of initial review will be the communicated to the requesting party and a quantitative evaluation will be undertaken to insure the proposal presented to the sponsoring organization provides benefit in excess of a threshold payout. Lastly, should the proposal fail to meet threshold criteria determined by the business entity, an automatic e-mail or other communication of rejection will be communicated to the requesting party. Assuming, however, the objectives and values are appropriate for the business entity, an auto response will be sent to the requesting party with a follow-up communication scheduled to secure agreements of all proposal parameters.

The communication between the requesting party and proposal sponsor takes place via a website based (GUI) dialogue in which the end user accesses a portion of a designated website relegated to registration submission and statusing processes. An additional processing 'administrative' capability associated with said website provides for the review, evaluation, and communication of proposal sponsor activities.

Consequently, given the deficiencies of the contemporary art and benefits of the instant invention, it is an object of the instant invention to provide a computer based method for automated submission evaluation of business proposals.

It is the further object of the instant invention to provide an automated analysis of proposal parameters minimizing human involvement and maximizing automated communication processes.

Yet another object of the instant invention is to disclosing claim computer based method wherein proposal submissions are centrally received, stored and accessed.

The further object of the instant invention is to provide a computer based method where submitting parties are advised of proposal selection criteria in advance of proposal submission.

Yet another object of the instant invention is to provide a means by which a user community may check on the status of multiple requests.

Yet another object of the instant invention is to provide a computer based method in which a central location can be utilized to access and view all proposals including the checking of status of requests and the providing of a historical record.

A further object of the instant invention is to streamline an administrative process whereby requests are appropriately categorized, evaluated and responded to.

BRIEF DESCRIPTION OF DRAWINGS

For a more complete understanding of the present invention, and the advantages thereof, reference is now made to the following descriptions taken in conjunction with the accompanying drawings, in which:

FIG. 2 illustrates a non-limiting sequence of process steps involved in the execution and practice of an embodiment of the instant invention.

DETAILED DESCRIPTION OF THE INVENTION

Figure 1:
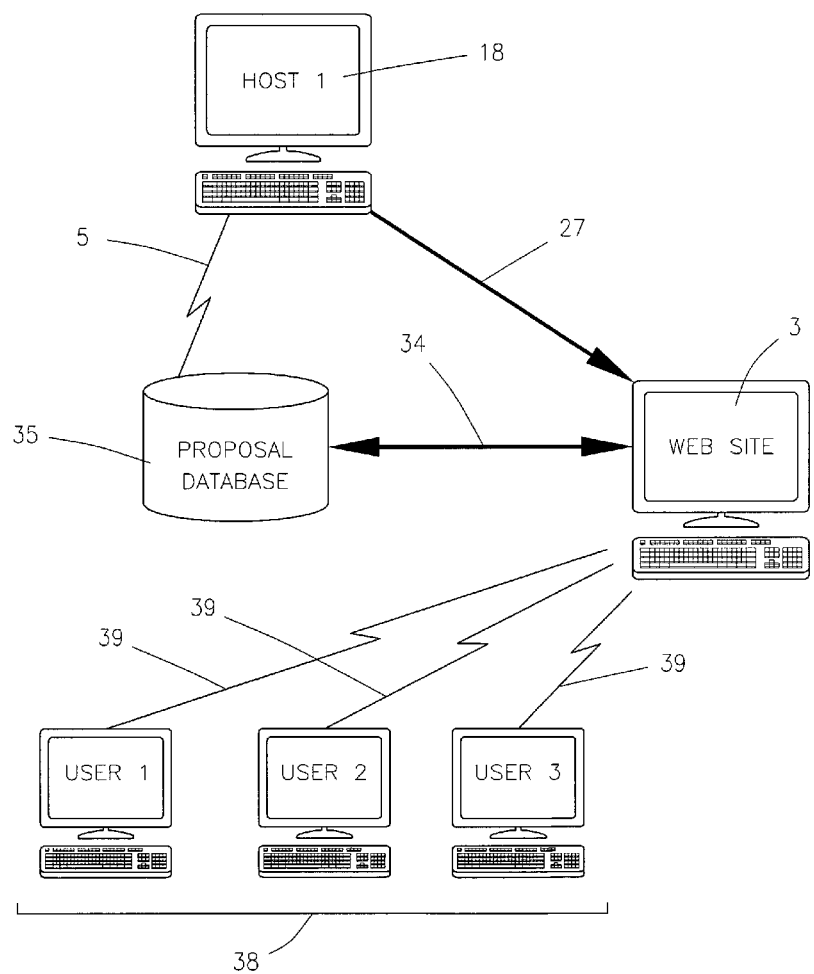
FIG. 1 is an illustration showing processing components and communities as disclosed in one embodiment of the instant invention.

While making and using of various embodiments of the present invention are discussed in detail below, it should be appreciated that the present invention provides for inventive concepts capable of being embodied in a variety of specific contexts. The specific embodiments discussed herein are merely illustrative of specific manners in which to make and use the invention and are not to be interpreted as limiting the scope of the instant invention.

The claims and specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

For the purposes of clarity and convenience of disclosure, the computer based method of the instant invention will be supplemented with information relevant to the airline industry. By so doing, this disclosure is not intended to limit the claims and subject matter of the instant invention to the airline or any one particular industry. Rather, the providing of such information is to enable those reasonably skilled in the relevant art to easily comprehend the robust and flexible nature of the instant invention and its applicability to any corporate or business entity desirous of automated proposal sponsorship evaluation.

FIG. 1 illustrates processing components and communities as disclosed in one embodiment of the instant invention. In FIG. 1, a proposal sponsor computing capability 18 is shown in communication with a website 3 and proposal data base 35. The sponsoring entity 18 may communicate with the proposal data base 35 either directly with any computer compatible communication network 5 means or may interactively communicate with said data base 35 via website 3. Also shown on FIG. 1 is a user community 38 in communication with said website 3 for purposes of establishing and submitting a proposal request.

FIG. 2 illustrates a non-limiting sequence of process steps involved in the execution and practice of an embodiment of the instant invention. In FIG. 2, it is shown where a data base is provided that is mutually accessible to a proposal sponsor and at least one requesting user community 51. The user community initially logs on or otherwise accesses a data base 35 (FIG. 1) via website 3 (FIG. 1). The methodology of the instant invention requires the user community to be uniquely identifiable to properly associate one or more proposal requests with said user community. Non-limiting information requested of the user in a first instance would include the creation of a uniquely identifiable login account, a review of the institutions promotional guidelines and information parameters relevant to a user communities' sales promotion. An example of a non-limiting website/database premised dialogue immediately follows as Table 1, and provides disclosure with respect to a user community initiating a promotions request to an airline proposal sponsor (therein for purposes of example identified as American Airlines).

Table 1 as herein immediately provided is practiced in the form of a website communication between a sponsoring entity and a user community. Also provided in Table 1 are non-limiting examples of frequently asked questions typically posed to sponsoring organizations when interfacing with a requesting user or user community.

TABLE 1

| | Home Page |
|---|---|
| HEAD: | Welcome to PRO |
| | Promotions Requests Online for American Airlines |
| COPY: | American Airlines proudly participates in a wide range of events and sponsorship opportunities and continues to seek out new promotional partners on local and national levels. And in an effort to simplify the process, we created this online site where you will find everything you need to register your business or organization and submit your opportunity for promotional consideration. |
| SUB: | First Time Users Start Here |
| | If you're interested in submitting a sales promotion proposal to American Airlines, select Create Account option and complete the 3-step process. |
| |     Step 1:    Review promotional guidelines |
| |     Step 2:    Create your log in account. You will be asked contact information to create your account. |
| |     Step 3:    Enter information regarding your sales promotion. |
| | [Start] |
| SUB: | Already registered? Click here to login. |
| | [Enter] |
| | Want to attract New Customers? |
| | Or maybe you want to get existing customers to spend more? Wait - how about both? When you offer miles, AAdvantage members will find you and they will spend more with you. They're just about the most perfect, motivated and devoted consumers you could ask for. And now with our new online site www.orderAAmiles.com, even small businesses and nonprofits organizations can easily purchase AAdvantage miles over the Internet. In addition to automating mileage ordering, the new Web site also provides comprehensive information on pricing, marketing and frequently asked questions. OrderAAmiles.com is a great tool for businesses to learn about and purchase miles for use as a customer or employee incentive. |
| | [Ad Unit] |
| | Targeting Your Market |
| | We'll help you get the word out - and make sure the right people are listening. When you partner with AAdvantage Marketing (sm) programs, you get access to all kinds of online and offline marketing communication channels: from newsletters and direct mail to our eSummary and promotional e-mail campaigns. You can also deliver highly targeted messages to specific member segments. Learn More |
| NAV: | Home |
| | Log in |
| | Create Account |
| | Promotion Guidelines |
| | FAQ's |
| | [Ad Unit] |

| | Promotion Guidelines Page |
|---|---|
| HEAD: | Tips to a Winning Proposal |
| COPY: | Please take a moment to review our sponsorship and promotional guidelines. By doing so, you'll learn our minimum requirements for participation, what type of programs are incompatible with our brand, and how you can improve your prospects. |
| | If you are interested in submitting a for-profit proposal, click here for the specific guidelines. [Anchor link to for-profit tips.] |
| | If you are interested in submitting a non-profit proposal, click here for the specific guidelines. [Anchor link to non-profit tips.] |
| | Please consult our FAQs should you have any questions that may occur while using the site. |
| | For-Profit Guidelines - |

Promotional Guidelines

American requires a written proposal for a promotion, sponsorship, or participation in an event submitted at least eight (8) weeks in advance of the start date of the program.
American's primary objective for sponsorship/promotions is to generate sales. Therefore American does not sponsor programs that do not give exposure in at least one market it services. American's secondary objective is to complement and enforce current corporate marketing strategies with a substantial amount of high-quality exposure.

Target Audience

American Airlines primary target is adults 25-54 who travel frequently on business.

Sponsorship Objectives/Guidelines

As a sponsor, American requires the audience to not only know that we are a sponsor, but also to learn something about American and its services. American prefers to participate in sponsorships and promotions that use advertising media like TV, radio, newspapers, magazines and TABLE 1-continued direct mail. We require ample time and space to deliver a specific strategic or sales message. Therefore, American prefers to have its logo/name be accompanied by an image of an airplane and a specific tag line/graphic.

American Airlines enjoys high brand-name recognition. Just logo or name exposure has little value to us. We will not participate if the only mention is "transportation provided by American Airlines". We will not participate in a program if point-of-purchase materials, banners, posters or other display material is the only or principal advertising vehicle. We prefer to have actual media advertising as part of the sponsorship package. For example, American is able to show its own broadcast commercials or its own signage at an event venue rather than just being included on the sponsorship's promotional materials.

American expects that no other companies providing passenger air travel will be associated with the sponsorship.

American will not participate in programs that are tied to any type of motorsports, tobacco, alcohol, or directly tied to politics or religion. We do not sponsor individuals or K-12 schools.

Promotional/Sponsorship Elements

What we typically find valuable:
Media Value: TV, radio, newspaper, magazines, and outdoor advertising
Promotional Elements: direct marketing, program ads, signage, display booths, collateral material
Client Entertainment Elements: Tickets/tables to events, meals and hotel rooms Event Sponsorship If your sponsorship is for an event, there are some things we need to know:
Is it local, regional or national?
City/County where event will take place
Name of Event
Date(s)
Other sponsors
Number of people expected to attend
Name of charity if applicable
Brief Description of Event
What do you want American Airlines to provide?
What is the specific use of requested tickets?
What are the face values of any client entertainment elements and program ads?
Target Audience
What media advertising will be provided?

Tie-in Promotion with sweepstakes or contest

What we need to know:
Local, regional or national
Name of Event
Start date: End Date:
Brief Description of program
Other sponsors
What do you want American Airlines to provide?
Target Audience
What media advertising will be provided?
Ready to submit a proposal? Be sure to register or login.

NAV: Home
Log in
Create Account
Promotion Guidelines
FAQ's

Community Promotional Guidelines Page

HEAD: Tips to a Winning Proposal
COPY: Non-Profit Guidelines

Promotional Guidelines

To properly consider and review your request, American requires a written proposal for a promotion, sponsorship, or participation in an event submitted at least eight (8) weeks in advance of the start date of the program.

Our primary objective is to support programs that generate sales and goodwill exposure to the company and community. We would also like to complement and enforce our current corporate marketing strategies with high-quality exposure.

TABLE 1-continued

Sponsorship Objectives/Guidelines

As a sponsor, American looks for exposure that not only recognizes our support but also educates the audience about our company and its services.

In our efforts to reach our target audience, we want to take advantage of promotions that use advertising media to deliver our strategic or sales message. We also prefer to have the AA logo/name accompanied by an image of an airplane and a specific tag linke/graphic on any collateral resulting from our support.

At American Airlines, we enjoy high brand-name recognition and would request more than just the mention of "air transportation provided by American Airlines". If possible, we prefer to have actual media advertising as part of the sponsorship package. Ideally, we would like to be included on the sponsorship's promotional materials. Depending upon the event and collateral, we will partner with you to maximize our sponsorship opportunities.

We also look for opportunities where no other companies providing air transportation are associated with the sponsorship. Additionally, we are unable to participate in programs that are associated with any type of motorsports, tobacco, alcohol, or directly tied to specific political or religious entity. Since the number of requests we receive are in excess of those that we can accommodate, we are unable to sponsor individuals or K-12 schools.

Promotional/Sponsorship Elements

What we typically find valuable in a partnership:
Media Value
Promotional Elements: direct marketing, program ads, signage, display booths, collateral material
Client Entertainment Elements: Tickets/tables to events, meals and hotel rooms

Event Sponsorship

If your sponsorship is for an event, please include the following information:
Is it local, regional or national?
City/County where event will take place
Name of Event
Date(s)
Other sponsors
Number of people expected to attend
Name of Charity if applicable
Brief Description of Event
What do you want American Airlines to provide?
What is the specific use of requested tickets?
What are the face values of any client entertainment elements and program ads?
Target Audience
What media advertising will be provided?

Tie-in Promotion with sweepstakes or contest

What we need to know:
Local, regional or national
Name of Event
Start date: End Date:
Brief Description of program
Other sponsors
What do you want American Airlines to provide?
Target Audience
What media advertising will be provided?
Ready to submit a proposal? Be sure to register or login.

| | |
|---|---|
| NAV: | Home |
| | Log in |
| | Create Account |
| | Promotion Guidelines |
| | FAQ's |
| HEAD: | FAQ's |
| COPY: | Q. How Do I Register? Why Do You Need This Information? |
| | A. We need you to provide basic registration information so that we can easily notify you with reviews and approvals of your submissions. By registering once, you can simplify the process of submitting future requests, and you can easily check on the status of your current requests. |
| | Q. How Do I Submit A Proposal? |
| | A. After you register, click on the Submit tab under "Proposal Options". Just follow the directions on the form to submit your proposal online. You can also attach supporting documents to your submission. |

TABLE 1-continued

|       | |   |
|-------|---|---|
|       | Q. | How Far In Advance Do I Need To Submit A Proposal? |
|       | A. | We require eight weeks from the date of your event or activity to fully evaluate your request. You can submit a proposal with less than eight weeks' notice, but note that it will most likely be quickly declined. |
|       | Q. | How Long Does It Take For You To Review My Proposal? |
|       | A. | We typically review proposals within three weeks. Some proposals may be automatically declined (see guidelines). You will receive an e-mail notice upon receipt of your proposal as well as after our initial review. You can always check on the status of your proposal online under the "Review Proposals" tab. |
|       | Q. | Can I Re-submit My Proposal? |
|       | A. | Yes, as long as you revise it to address our concerns. Some proposals are automatically declined because they do not meet AA's brand standards or promotional guidelines. If your proposal does not meet our guidelines based on dollar value, you may decide to offer additional value or advertising opportunities. Any proposals submitted and revised more than three times will automatically be rejected. |
|       | Q. | Can I Submit More Than One Proposal? |
|       | A. | Yes, but note that similar or duplicate proposals will be automatically declined. |
|       | Ready to submit a proposal? Be sure to register or login. | |
|       | [Next] | |
| NAV:  | About Site | |
|       | Site Map | |
|       | Feedback | |
|       | Legal | |

Create Account Page 1

|       |   |
|-------|---|
| HEAD: | Register Your Organization |
| BC:   | Step One |
| COPY: | Here you'll create an account consisting of your e-mail address and a password you choose. From there, you will enter your contact information and answer questions about your request. |
|       | If you do not finish all the steps at one time and wish to return to complete your account, you may do so by logging in with the e-mail address and password you originally entered and chose the View/Edit option under Account. |
|       | E-mail Address [Enter Field] |
|       | Your password must be at least 5 characters |
|       | Password [Enter Field] |
|       | Confirm Password [Enter Field] |
|       | [Next] |
| NAV:  | About Site |
|       | Site Map |
|       | Feedback |
|       | Legal |

Create Account Page 2

|       |   |
|-------|---|
| HEAD: | Please provide your contact information: |
| BC:   | Step Two |
| COPY: | Name of Organization [Enter Field] |
|       | Your First Name [Enter Field] |
|       | Your Last Name [Enter Field] |
|       | Title [Enter Field] |
|       | Mailing Address [Enter Field] |
|       | Shipping Address (if different from mailing address.) [Enter Field] |
|       | E-mail [E-mail would pre-populate from user name] [Enter Field] |
|       | Phone Number [Enter Field] |
|       | Alternate Phone Number [Enter Field] |
|       | Fax Number [Enter Field] |
|       | [Next] |
|       | [After this entry page, when the user clicks Next, user will view and confirm the information they entered] |
|       | [Edit] [Confirm] |
| NAV:  | About Site |
|       | Site Map |
|       | Feedback |
|       | Legal |

TABLE 1-continued

| | |
|---|---|
| HEAD: | Submit Your Promotional Information |
| BC: | Step Three |
| COPY: | Please answer the following questions about your promotional opportunity: |

Note:    If you do not complete all sections, you can click "Save" at the bottom of the page and return to complete.

1. Which of the following best describes your program? [Select One]
   - _____ Tie-in Promotion: A consumer promotion that involves two or more brands with incentive to buy both.
   - _____ Sweepstakes/contest: Winning by chance/winning by skill
   - _____ Cause/Charity Related: An event or program with proceeds donated to charity or a cause
   - _____ Product Placement: On screen exposure in motion picture or television
   - _____ Event: i.e. sport's tournament, concert, etc. or other activity attracting large amounts of people
2. Does your promotion relate to any of the following subjects or activities?
   Political or religious organizations/causes [Yes/No]
   Alcohol or tobacco companies [Yes/No]
   Motorsports, e.g., auto racing [Yes/No]
   K-12 school/after-school programs/amateur sports teams [Yes/No]

[Should only go to the next page if all answers have been provided. If not, then prompt for response.]
[Save] [Next]
Initial Review Decline Response Screen [If any item in question #2 is selected, then this screen will display and the process will end.]

| | |
|---|---|
| HEAD: | Promotional Information - Decline |
| COPY: | Thank you for your interest, however American does not participate in promotions or events that involve (blank). |

[Insert corresponding selection from question #2
Political or religious organizations/causes
Alcohol or tobacco companies
Motorsports, e.g., auto racing
K-12 school/after-school programs/amateur sports teams]
You may re-submit your proposal as long as you revise it to address our concerns. Any proposals submitted and revised more than three times will automatically be rejected. You may check the status of any additional proposals you may have submitted by logging in and clicking on Status under the Proposal link.
Thank you for considering American Airlines and we wish you luck with your promotion or event.
[Status Link]
[Log out]

| | |
|---|---|
| HEAD: | Enter Promotion Information |
| COPY: | |

3. When will your program or event occur? [Select function: Month/Day/Year]
   (If under eight weeks in time then the following notice will display under the date selected "Please note we prefer a lead time of eight weeks in advance of the promotion's date in order for us to properly fulfill your request. We cannot help you if your event or promotion is scheduled within 8 weeks.")
4. Please select the location of your event or promotion that is nearest the following cities served by American Airlines/American Eagle
   [City Pick List]
5. Please describe the Target Audience reached by your proposal:
   _____
6. What do you want from us? Travel _____ Cash/Amount_____

Domestic/North America Tickets

Contiguous 48 states including travel to Canada and Mexico
- Coach Class     _____ (indicate quantity)
- First Class     _____ (indicate quantity)

From the Contiguous 48 states to Hawaii
- Coach Class     _____ (indicate quantity)
- First Class     _____ (indicate quantity)

International Tickets

From the U.S. to Europe
- Coach Class     _____ (indicate quantity)
- Business Class     _____ (indicate quantity)
- First Class     _____ (indicate quantity)

From the U.S. to Latin America
- Coach Class     _____ (indicate quantity)
- Business Class     _____ (indicate quantity)
- First Class     _____ (indicate quantity)

TABLE 1-continued

|  |  | From the U.S. to Japan |  |
|---|---|---|---|
|  |  | Coach Class | _____ (indicate quantity) |
|  |  | Business Class | _____ (indicate quantity) |
|  |  | First Class | _____ (indicate quantity) |
|  |  | [Save][Next] |  |
| HEAD: |  | Enter Promotion Information |  |
|  | 8. | If your promotion includes advertising, please describe the media types and amount. |  |

Indicate what type/size and the approximate value of the advertising placement(s) that would be dedicated to American Airlines. Check all that apply.

_____ Newspaper    Paper Name _____

_____

Ad Size (column size) ____ columns wide × _____ columns deep
Total Number of insertions: _____ Insertion Dates: _____
Describe positioning/placement of the ad: [Pick list]
What percent of newspaper ad space will include American Airlines message? _____% [Pick list of 10-100%]
_____ Space is 100% dedicated to AA message.
Additional information: _____ [Add Additional Newspaper] _____
_____ Magazine    Magazine Name(s) _____
Ad Size [Pick list of Spread, Full Page, Half Page and Quarter Page]
Total Number of insertions: _____ Insertion Dates: _____
What percent of magazine ad space will include an American Airlines message? _____% [Pick list of 10-100%]
Describe positioning/placement of the ad: [Pick list]
_____ Space is 100% dedicated to AA message.
Additional information: _____ [Add Additional Magazine]
_____
____ TV    Is the buy: _____ Local or _____ Network?
Television Station: _____
Ad length [Pick list of :60, :30, :15 or :10]
Total Number of Spots: _____ Dates: From _____ To _____
Daypart of Placements: [Pick list of drive time, daytime, early prime, prime, late]
Name of Program where the spots airs: _____ or _____ various
What percent of TV ad time will include an American Airlines message? _____
_____ Space is 100% dedicated to AA message.
Additional information: _____ [Add Additional Stations] _____
_____ Radio    Station: _____
Radio Station format, i.e. country, top 40, oldies etc. _____
Ad length [Pick list of :60, :30, :15 or :10]
Total Number of Spots: _____ Flight Dates: From _____ To _____
Daypart of Placements: [Pick list of drive time, daytime, early prime, prime, late]
Will the spots be a _____ live read by local talent or _____ Pre-recorded?
What percent of radio ad time will include an American Airlines message? _____
_____ Space is 100% dedicated to AA message.
Additional information: _____ [Add Additional Stations] _____
_____ Out of Home Signage and Displays
Total Number of Placements: _____ Dates: From _____ To _____
Signage Type: [Pick list of Billboard, Banner, Diorama, Concourse Signage]
Signage Dimension: _____ [feet/inches] wide × _____ [feet/inches] deep
What percent of the signage will include an American Airlines message? _____
_____ Space is 100% dedicated to AA message.
Additional information: _____ [Add Additional Signage] _____
____ Internet    List of web site(s): _____
Ad Type: [Pick list of banner, button, skyscraper, other]
Ad Size: Pixel Dimensions_____ wide x _____ deep
Total Number of Impressions: _____ Flight Dates: From _____ To _____
What percent of the ad unit will include an American Airlines message? _____
_____ Space is 100% dedicated to AA message.
Additional information: _____ [Add Additional Web Sites] _____
_____ Event Program
Ad Size [Pick list of Spread, Full Page, Half Page and Quarter Page]

TABLE 1-continued

|  |  |  |
|---|---|---|
|  |  | Total Number of insertions: _____ Program Dates: _____ |
|  |  | Describe positioning/placement of the ad: _____ |
|  |  | What percent of the program ad space will include an American Airlines message? _____% [Pick list of 10-100%] |
|  |  | _____ Space is 100% dedicated to AA message. |
|  |  | Additional information: _____ [Add Additional Items] _____ |
|  |  | _____ Direct Mail |
|  |  | Placement [Pick list of Insert, FSI, Dedicated Mailer, Message In Mailer] |
|  |  | Placement Size: Dimensions ____" wide × ____" deep |
|  |  | Total Number of drops: ____ Drop dates: ____ |
|  |  | What percent of the mailing will include an American Airlines message? _____ % [Pick list of 10-100%] Space is 100% dedicated to AA message. |
|  |  | Additional information: _____ [Add Additional Items] _____ |
|  |  | Please indicate the total media value of your proposal: _____ |
|  | 9. | If an event, will we be able to display or distribute American Airlines materials? |
|  |  | [Yes/No] |
|  | [Save] [Next] |  |
| NAV: | About Site |  |
|  | Site Map |  |
|  | Feedback |  |
|  | Legal |  |
| HEAD: | Enter Promotion Information |  |
|  | 10. | Will we receive tickets/access for American representatives and/or guests? |
|  |  | [Yes/No] - If "yes" then how many [Fill in blank] and what is the approximate dollar value $[Fill in blank] |
|  | 11. | How would the air travel be used? |
|  |  | [Pick list of Auction, Entertainment, Fundraiser, Guest Travel, Prize Package, Media Tie-in, Staff Travel, Other |
|  |  | Additional details: [Fill in blank] |
|  | [Save] [Next] |  |
| NAV: | About Site |  |
|  | Site Map |  |
|  | Feedback |  |
|  | Legal |  |
| HEAD: | Enter Promotion Information |  |
| COPY: | 12. | If you would like to add any additional comments then please enter them in the space below. |
|  |  | [Text Entry Field] |
|  | 13. | You may attach additional information e.g., photos, supporting documentation, etc., but it is not required and may not be reviewed. |
|  |  | [Browse] [Add attachment] |
|  | Before you submit your proposal, please use your browser's back button to review your answers. You may also review your proposal after submitting it by logging in and choosing the "Status" option under Proposal. Click on the Review button next to the promotion name and date. |  |
|  | Click on Cancel if you no longer wish to submit your proposal at this time. |  |
|  | You may also withdraw your submission at any time in by logging in and choosing the Status option under Proposal and clicking on the Delete button. |  |
|  | [Save] [Submit to American] [Cancel] |  |
| NAV: | About Site |  |
|  | Site Map |  |
|  | Feedback |  |
|  | Legal |  |
| HEAD: | Thank you/Confirmation |  |
| COPY: | Thank you for submitting your proposal and your interest in American Airlines. Please remember that a reply may take up to four weeks. However, if your promotion does not meet our minimum requirements or is not compatible with our brand, then you may receive a faster reply that declines your request. |  |
|  | You may check the status of your proposal by logging in and clicking on Status under the Proposal link. |  |
|  | Thank you. |  |
|  | [Status] [Log out] |  |
| NAV: | About Site |  |
|  | Site Map |  |
|  | Feedback |  |
|  | Legal |  |

TABLE 1-continued

SUBJECT: American Airlines Promotion Request
HEAD: AA Promotion Request Name: XYZ Proposal
COPY: Thank you for submitting your proposal and for your interest in American. After careful review, your promotion does not meet our requirements or is not compatible with our brand for the following reasons:
(Reason One) The cost of participation exceeds the value of the exposure.
(Reason Two) We do not participate in promotions that involve (blank).
You may check the status of any additional proposals you may have submitted by logging in and clicking on Status under the Proposal link.
[Status Link]
Thank you for considering American Airlines and we wish you good luck with your event.
SUBJECT: American Airlines Promotion Request
HEAD: AA Promotion Request Name: XYZ Proposal
COPY: Thank you for submitting your proposal and for your interest in American Airlines. After careful review, your promotion meets our requirements for participation. Our next step is to complete a formal evaluation and we may contact you within the next five business days for additional information.
You may check the status of any additional proposals you may have submitted by logging in and clicking on Status under the Proposal link.
[Status Link]
Thank you for considering American Airlines.

Having once identified user-specific information and proposal input parameters generally according to the example dialogue provided in Table 1, the proposal sponsor has successfully communicated with the uniquely identifiable user community and has interactively requested one or more media or promotional elements for evaluation 54.

The sponsoring business entity or proposal sponsor next interrogates the promotional elements for evaluation and recognizes and accepts one or more media and promotional elements for evaluation 57.

A proposal data base is then populated with a first set of proposal values when identified by a uniquely identifiable user community, with the proposal values selected from a group of proposed media elements including, but not limited to newspaper, magazine, television, radio and computer-premised elements 60.

A second set of proposal elements is then populated to the data base of the instant invention with the second set of said value selected from a group of proposed promotional elements including, but not limited to out-of-home signage displays, program events, direct marketing, event giveaways and entertainment elements. A non-limiting example of database elements and their representative definitions with respect to uniquely identifiable user details, promotional elements and media elements follows immediately as Table 2, wherein

TABLE 2

| Database Element: | Definition: |
| --- | --- |
| User details: | |
| user_name | Name of user (e-mail address) |
| Orgname | Name of organization |
| Title | Title |
| Firstname | First name |
| Lastname | Last name |
| Mailingaddress | Mail address |
| Mailingcity | Mail City |
| Mailingstate | Mail State |
| Mailingzip | Main Zip code |
| Shippingaddress | Ship address |
| Shippingcity | Ship City |
| Shippingstate | Ship State |

TABLE 2-continued

| Database Element: | Definition: |
| --- | --- |
| Shippingzip | Ship Zip |
| Phone | Telephone number |
| Altphone | Additional Telephone number |
| Fax | Fax number |
| time_stamp | Date of registration |
| User Roles: | |
| use_name | User name |
| role_name | User state (subscriber, admin) |
| Users: | |
| user_name | User name (e-mail address) |
| user_pass | User password |
| region_id | Region ID number |
| Zip codes: | |
| Zip | Zip code |
| Longitude | Longitude |
| Latitude | Latitude |
| Adunit Internet: | |
| adunit_id | Ad Unit ID number |
| proposal_id | Proposal ID number |
| size_w | Size of ad unit-width |
| size_h | Size of ad unit-height |
| Insertions | Number of insertions |
| insertion_start | Start Date of advertising |
| insertion_end | End Date of advertising |
| aa_message_percent | Percent of message dedicated to AA |
| additional_info | Open text field for more info |
| Websites | List of publisher web sites |
| Adtype | Type of Interactive ad |
| Mediavalue | Dollar value of media |
| Region: | |
| region_id | Region ID number |
| Region | Region name |
| Ticket value: | |
| wanteddomesticcoach | Ticket value |
| wanteddomesticbusiness | Ticket value |
| wanteddomesticfirst | Ticket value |
| wantedhawaiicoach | Ticket value |
| wantedhawaiibusiness | Ticket value |
| wantedhawaiifirst | Ticket value |
| wantedeuropecoach | Ticket value |

TABLE 2-continued

| Database Element: | Definition: |
| --- | --- |
| wantedeuropbusiness | Ticket value |
| wantedeuropefirst | Ticket value |
| wantedcaribbeancoach | Ticket value |
| wantedcaribbeanbusiness | Ticket value |
| wantedcaribbeanfirst | Ticket value |
| wantedcentralcoach | Ticket value |
| wantedcentralbusiness | Ticket value |
| wantedcentralfirst | Ticket value |
| wantedsouthcoach | Ticket value |
| wantedsouthbusiness | Ticket value |
| wantedsouthfirst | Ticket value |
| wantedjapancoach | Ticket value |
| wantedjapanbusiness | Ticket value |
| wantedjapanfirst | Ticket value |
| Adunit magazine: | |
| adunit_id | Ad Unit ID number |
| proposal_id | Proposal ID number |
| Name | Publication name |
| Insertions | Number of insertions |
| insertion_dates | Dates the ad appears |
| Positioning | Placement within the publication |
| aa_message_percent | Percent of message dedicated to AA |
| Adtype | Type of magazine ad |
| additional_info | Open text field for more info |
| Mediavalue | Dollar value of media |
| Adunit newspaper: | |
| adunit_id | Ad Unit ID number |
| proposal_id | Proposal ID number |
| Name | Publication name |
| Rate | Column inch rate |
| size_w | Size of ad unit-width |
| size_h | Size of ad unit-height |
| Insertions | Number of insertions |
| insertion_dates | Dates the ad appears |
| Positioning | Placement within the publication |
| aa_message_percent | Percent of message dedicated to AA |
| additional_ info | Open text field for more info |
| Mediavalue | Dollar value of media |
| Adunit radio: | |
| adunit id | Ad Unit ID number |
| proposal_id | Proposal ID number |
| Stationlist | List of radio stations |
| Adlength | Length of radio spot |
| Insertions | Number of spots |
| insertion_start | Start Date of advertising |
| insertion_end | End Date of advertising |
| Daypart | Day part ad is run |
| Performed | Ad is live read |
| aa_message_percent | Percent of message dedicated to AA |
| additional_info | Open text field for more info |
| Mediavalue | Dollar value of media |
| Adunit signage: | |
| adunit_id | Ad Unit ID number |
| proposal_id | Proposal ID number |
| Placements | Number of placements |
| Signtype | Type of signage |
| insertion_start | Start Date of advertising |
| insertion_end | End Date of advertising |
| size_w | Size of ad unit-width |
| size_h | Size of ad unit-height |
| size_unit | Type of ad unit |
| aa_message_percent | Percent of message dedicated to AA |
| additional_info | Open text field for more info |
| Mediavalue | Dollar value of media |
| Adunit television: | |
| adunit_id | Ad Unit ID number |
| proposal_id | Proposal ID number |
| Coverage | Local or Network buy |
| Stationlist | List of TV stations |
| Adlength | Length of TV spot |
| Insertions | Number of placements |
| insertion_start | Start Date of advertising |
| insertion_end | End Date of advertising |
| Daypart | Day part ad is run |
| aa_message_percent | Percent of message dedicated to AA |
| additional_info | Open text field for more info |
| Mediavalue | Dollar value of media |
| Airports (markets): | |
| Code | Airport Code |
| City | City Name |
| State | State Name |
| Zip | Zip code |
| Regions | Region Name |
| Preffered organization: | |
| organization_id | Organization ID number |
| user_name | User Name |
| organization_name | Organization Name |
| Proposals: | |
| proposal_id | Proposal ID number |
| Proposalname | Proposal Name |
| user_name | User Name |
| Status | Status of Proposal |
| Description | Type of Proposal |
| Airport | Location to nearest airport |
| Additionalcities | List of Additional cities |
| Eventdate | Calendar date of event |
| Targetaudience | Target audience selection |
| Cashvalue | Cash amount |
| wanteddomesticcoach | Number of tickets requested |
| wanteddomesticbusiness | Number of tickets requested |
| wanteddomesticfirst | Number of tickets requested |
| wantedhawaiicoach | Number of tickets requested |
| wantedhawaiibusiness | Number of tickets requested |
| wantedhawaiifirst | Number of tickets requested |
| wantedeuropecoach | Number of tickets requested |
| wantedeuropebusiness | Number of tickets requested |
| wantedeuropefirst | Number of tickets requested |
| wantedcentralcoach | Number of tickets requested |
| wantedcentralbusiness | Number of tickets requested |
| wantedcentralfirst | Number of tickets requested |
| wantedsouthcoach | Number of tickets requested |
| wantedsouthbusiness | Number of tickets requested |
| wantedsouthfirst | Number of tickets requested |
| wantedjapancoach | Number of tickets requested |
| wantedjapanbusiness | Number of tickets requested |
| wantedjapanfirst | Number of tickets requested |
| Traveluse | Ticket use |
| Wanteddetails | Open text field for more info |
| Aadisplay | Will AA signage be displayed |
| aarecievetickets | Will AA receive event tickets |
| aaticketnumber | Number of tickets for AA |
| Aaticketvalue | Value of tickets for AA |
| additionalcomments | Open text field for more info |
| additionalmaterials | Add file |
| wantedcaribbeancoach | Number of tickets requested |
| wantedcaribbeanbusiness | Number of tickets requested |
| wantedcaribbeanfirst | Number of tickets requested |
| None | |
| organization_id | Organization ID number |
| manager_pre_contract_comments | Open text field for more info |
| notify_admin_for_contract_email | E-mail address field |
| post_comments | Open text field for more info |
| obligation_flag | Red, green or blue status |
| recognized_flag | |
| hung_prominently_flag | |
| only_airline_sponsor_flag | |

It will again be seen that Table 2 clearly defines airline specific elements, however, those reasonably skilled in the relevant art will quickly determine and recognized that alternative database structures and element definitions may be provided to adapt the teachings of the instant invention to a plurality of business entity evaluation requirements.

Continuing our discussion of FIG. 2, wherein the invention next calculates a sponsoring entity payment value 65 based upon the populated media elements and populated promotional elements, according to schema provided by the proposal sponsor. Such evaluation schema is herein immediately provided as Table 3 wherein the payment value for purpose of non-limiting yet consistent example is associated with an airline-calculated schema.

TABLE 3

Travel
Domestic/North America Tickets
Contiguous 48 states including travel to Canada and Mexico

| | |
|---|---|
| Coach Class | ____(quantity × per ticket value = $750) |
| First Class | ____(quantity × per ticket value = $2,200) |
| From the Contiguous 48 states to Hawaii | |
| Coach Class | ____(quantity × per ticket value = $900) |
| First Class | ____(quantity × per ticket value = $4,000) |
| International Tickets From the U.S to Europe | |
| Coach Class | ____(quantity × per ticket value = $1,600) |
| Business Class | ____(quantity × per ticket value = $4,000) |
| First Class | ____(quantity × per ticket value = $6,200) |
| From the U.S to Central America | |
| Coach Class | ____(quantity × per ticket value = $1,600) |
| Business Class | ____(quantity × per ticket value = $2,300) |
| First Class | ____(quantity × per ticket value = $3,100) |
| From the U.S to South America | |
| Coach Class | ____(quantity × per ticket value = $3,000) |
| Business Class | ____(quantity × per ticket value = $4,500) |
| First Class | ____(quantity × per ticket value = $6,200) |
| From the U.S to Japan | |
| Coach Class | ____(quantity × per ticket value = $2,300) |
| Business Class | ____(quantity × per ticket value = $4,300) |
| First Class | ____(quantity × per ticket value = $6,600) |

Having once calculated a sponsoring entity payment value, the invention next compares the calculated payment value with at least one proposal recommendation threshold value 68. It is suggested that the minimum threshold value should be set to reflect at least a 1 to 1 ratio wherein the value to the sponsoring entity is equal to the requested participation value made of the sponsoring entity. However, as will be appreciated by those skilled in the art, good corporate citizenship or compelling business reasons may allow for varying of threshold analysis. Consequently, the threshold value is a variable construct and may be dynamically modified from proposal to proposal, to business entity to business entity, to user community to user community. In most events, however, the calculated payment value will be associated with the comparison results and a decision conclusion reached from one or more or a group of conclusions including "recommended", "not recommended" or "additional information required" 71. The so derived comparison result is then populated to the database mutually accessible to user communities or proposal sponsor, or indeed a secondary database if so desired 73. The robust and versatile practice of the instant invention allows for a plurality of threshold values, base values and adjusted values to be calculated according to schema derived by the sponsoring entity. Examples of such schema follow immediately as Table 4 with respect to media and promotional elements associated with the disclosed airline evaluation example.

TABLE 4

Media Elements
Newspaper

Newspaper Name:_____ Rate____
Ad Size (column size) ____ columns wide × ____ inches deep
Total Number of insertions: ____ Insertion Dates:____
Positioning: [Pick List- Main News, Business Section, Section Back Cover, Run of Press]
Percent American Airlines message ____%
[Pick list of 10-100%]
____ Space is 100% dedicated to AA message
Calculation:

Base Value = [(column width × inches) × Rate] × # of insertions
Adjusted Value = (Base Value + 10% Positioning bonus) × % Message
Magazine Magazine Name(s)_____ Rates: (Per Pick List)
Ad Size [Pick list of Spread, Full Page, Half Page and Quarter Page]
Total Number of insertions:____ Insertion Dates:____
Positioning: [Pick List- Inside Front Cover, Back Cover, Inside BC, Other]
Percent American Airlines message____% [Pick list of 10-100%]
____ Space is 100% dedicated to AA message.
Calculation:

Base Value = Ad Size Rate × # of insertions
Adjusted Value = (Base Value + 10% Positioning bonus) × % Message
TV ____Local or ____Network
Ad length [Pick list of :60, :30, :15 or :10]
Total Spots: ____
Dates: From____ To____
Daypart of Placements: [Pick list of early, daytime, early prime, prime, late, ROS]
Percent American Airlines message? ____ [Pick list of 10-100%]
____Space is 100% dedicated to AA message.
Calculation:

Average Market Cost Per Point (CPP) × Daypart Rating = Cost Per Spot (CPS)
TV Value = (Number of Spots × CPS) × % Message
Radio List of Station (s) _____
Radio Station format, i.e. country, top 40, oldies etc. ____
Ad length [Pick list of :60, :30, :15 or :10]
Total Number of Spots: ____ Flight Dates: From____ To____
Daypart of Placements: [Pick list of drive time, daytime, early prime, prime, late]
Will the spots be a____live read by local talent or____Pre-recorded?
Percent American Airlines message?____ [Pick list of 10-100%]
____ Space is 100% dedicated to AA message.
Calculation:

Average Market Cost Per Point (CPP) × Daypart Rating = Cost Per Spot (CPS)
Radio Value = (Number of Spots × CPS) × % Message
Interactive List of web site(s): _____
Ad Type: [Pick list of banner, button, skyscraper, other]
Ad Size: Pixel Dimensions ____wide × ____deep
Total Number of Impressions: ____ Flight Dates: From____ To____
Placement: [Pick list of home page, travel content, run of site]
Percent American Airlines message?____ [Pick list of 10- 100%]
____ Space is 100% dedicated to AA message.
Calculation:

Base Value = Ad Size Rate × # of insertions
Adjusted Value = (Base Value + 10% Positioning bonus) × % Message
Promotional Elements
Out of Home Signage and Displays Total Number of Placements: ____
Dates: From____ To____
Signage Type: [Pick list of Billboard, Banner, Diorama, Concourse Signage]

TABLE 4-continued

Signage Dimension: _____[feet/inches] wide × _____
[feet/inches] deep
Percent American Airlines message?_____ [Pick list of 10-100%]
____ Space is 100% dedicated to AA message.
Calculation:

Base Value = Average CPM × # of elements
Adjusted Value = (Base Value + 10% Positioning bonus) × % Message
Event Program Ad Size [Pick list of Spread, Full Page, Half Page and Quarter Page]
Total Number of insertions:_____ Program Dates:_____
Describe positioning/placement of the ad:_____
Percent American Airlines message_____% [Pick list of 10-100%]
____ Space is 100% dedicated to AA message.
Calculation:

Base Value = Ad Size Rate × # of insertions
Adjusted Value = (Base Value + 10% Positioning bonus) × % Message
Direct Marketing Placement [Pick list of Insert, FSI, Dedicated Mailer, Message In Mailer]
Placement Size: Dimensions ____" wide ×____" deep
Total Number of drops:_____ Drop Dates:_____
Percent American Airlines message_____% [Pick list of 10-100%]
____ Space is 100% dedicated to AA message.
Calculation:

Base Value = Average DM CPM ($300) × # of insertions
Adjusted Value = (Base Value + 10% Positioning bonus) × % Message
Event Giveaways Display or distribute American Airlines materials? [Yes/No]
Number of attendees_____
Calculation:

Base Value = Average CPM ($150) × # of insertions
Adjusted Value = (Base Value + 10% Positioning bonus) × % Message
Entertainment Elements Tickets/access for American representatives and/or guests? [Yes/No]
If "yes" then how many [Fill in blank]
Approximate dollar value $ [Fill in blank]
How would the air travel be used?
[Pick list of Auction, Entertainment, Fundraiser, Guest Travel,
Prize Package, Media Tie-in, Staff Travel, Other]
Proposed AA Payment Value Travel
Domestic/North America Tickets Contiguous 48 states including travel to Canada and Mexico
Coach Class            _____(quantity × per ticket value = $750)
First Class            _____(quantity × per ticket value = $2,200)
From the Contiguous 48 states to Hawaii Coach Class            _____(quantity × per ticket value = $900)
First Class            _____(quantity × per ticket value = $4,000)
International Tickets
From the U.S to Europe Coach Class            _____(quantity × per ticket value = $1,600)
Business Class         _____(quantity × per ticket value = $4,000)
First Class            _____(quantity × per ticket value = $6,200)
From the U.S to Central America Coach Class            _____(quantity × per ticket value = $1,600)
Business Class         _____(quantity × per ticket value = $2,300)
First Class            _____(quantity × per ticket value = $3,100)
From the U.S to South America Coach Class            _____(quantity × per ticket value = $3,000)
Business Class         _____(quantity × per ticket value = $4,500)
First Class            _____(quantity × per ticket value = $6,200)
From the U.S to Japan Coach Class            _____(quantity × per ticket value = $2,300)
Business Class         _____(quantity × per ticket value = $4,300)
First Class            _____(quantity × per ticket value = $6,600)
Total Ticket Values = _____

+Cash Amount (if any)_____
Grand Total of AA Payment Value = Total Ticket
Value_____ + Cash_____
Final Valuation The final valuation will be computed as the total value provided by
AA minus the total value of the proposal:
Value (+/−) = Grand Total of AA Payment Value − Grand Total
Proposed Values System notification for all values reflected as +/−
% of Proposed Value
Notification System Ratings As the system receives and evaluates proposals, the following scale
will be used to notify admin users of the calculated values
of the proposals:
Green = + ____% Proposed Value         (Recommend > +5%)
Yellow = +/− ____% Proposed Value      (Recommend −5 to −10%)
Red = − ____% Proposed Value           (Recommend > −10%)
Response time to the initial submission and fully submitted
proposal can be adjust by number of hours:
Initial Response: ____hours            (Recommend one hour
                                        for instant declines)
Full Response: ____hours               (Recommend 24 hours
                                        for initial evaluations -
                                        declines and preliminary
                                        evaluations.)

Although the invention has been described with reference to specific embodiments, these descriptions are not meant to be construed in a limiting sense. Various modifications of the disclosed embodiments, as well as alternative embodiments of the invention will become apparent to persons skilled in the art upon reference to the description of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

It is therefore, contemplated that the claims will cover any such modifications or embodiments that fall within the true scope of the invention.

What is claimed is:

1. A computer based method for automated submission and evaluation of business proposals comprising the steps of:
   (a) providing a database mutually accessible to a proposal sponsor and at least one requesting user community;
   (b) communicating with a uniquely identifiable user community and interactively requesting one or more media or promotional elements for evaluation;
   (c) recognizing and accepting from a uniquely identifiable user community one or more media and promotional elements for evaluation;
   (d) populating said database with a first set of proposal values when identified by a uniquely identifiable user community, said proposal first set values selected from a group of proposed media elements, including newspaper, magazine, television, radio, out of home media and online advertising elements;
   (e) populating said database with a second set of proposal elements when identified by a uniquely identifiable user community, said proposal second set values selected from a group of proposed promotional elements including out of home media, program events, direct marketing, event giveaways, event tickets and entertainment elements;

(f) calculating a proposal sponsor payment value based upon populated media elements of (d) and populated promotional elements of (e) according to schema provided by a proposal sponsor;

(g) comparing the calculated entity payment value of (f) with at least one proposal recommendation threshold value;

(h) associating the comparison result of (g) with a decision conclusion selected from one of a group of conclusions including, recommended, not recommended, and additional information required;

(i) populating, by a processor, the database of (a) with the decision conclusion derived in (h).

2. The method of claim 1 wherein the database population of claim 1(i) occurs within a second database exclusive of the database claimed in 1(a).

3. The method of claim 1 further comprising communicating the association result of 1(h) with at least one proposal sponsor.

4. The method of claim 1 further comprising communicating the association result of 1(h) with at least one requesting user community.

5. The method of claim 1 further comprising communicating the association result of 1(h) with at least one requesting user community and at least one proposal sponsor.

6. The method of claim 1 wherein the media element identified in claim 1(d) is television and further comprises a uniquely identifiable user community providing at least one media sub-element selected from a group of sub-elements including, local network, ad length, total spots, dates, daypart rating, number of placements, and percent proposal sponsor message;

calculating a cost per spot proposal value determined from the equation

Average Market Cost Per Point (CPP)×Daypart Rating=Cost Per Spot (CPS); and, calculating a TV value proposal determined from the equation;

TV Value=(Number of Spots×CPS)×% Message.

7. A computer based method for automated submission and evaluation of business proposals comprising the steps of:

(a) providing a database mutually accessible to a proposal sponsor commercially engaged within the travel industry and at least one requesting user community;

(b) communicating with a uniquely identifiable user community and interactively requesting one or more media or promotional elements for evaluation;

(c) recognizing and accepting from a uniquely identifiable user community one or more media and promotional elements for evaluation;

(d) populating said database with a first set of proposal values when identified by a uniquely identifiable user community, said proposal first set values selected from a group of proposed media elements, including newspaper, magazine, television, radio, out of home media and online advertising elements;

(e) populating said database with a second set of proposal elements when identified by a uniquely identifiable user community, said proposal second set values selected from a group of proposed promotional elements including out of home media, program events, direct marketing, event giveaways, event tickets and entertainment elements;

(f) calculating a proposal sponsor payment value based upon populated media elements of (d) and populated promotional elements of (e) according to schema provided by a proposal sponsor;

(g) comparing the calculated entity payment value of (f) with at least one proposal recommendation threshold value;

(h) associating the comparison result of (g) with a decision conclusion selected from one of a group of conclusions including, recommended, not recommended, and additional information required;

(i) populating, by a processor, the database of (a) with the decision conclusion derived in (h).

8. The method of claim 7 wherein the proposal sponsor engaged with the travel industry is an airline.

9. The method of claim 7 wherein the database population of claim 7(i) occurs within a second database exclusive of the database claimed in 1(*a*).

10. The method of claim 7 further comprising communicating the association result of 7(h) with at least one travel industry proposal sponsor.

11. The method of claim 7 further comprising communicating the association result of 7(h) with at least one requesting user community.

12. The method of claim 7 further comprising communicating the association result of 7(h) with at least one requesting user community and at least one travel industry proposal sponsor.

13. The method of claim 7 wherein the media element identified in claim 7(d) is television and further comprises a uniquely identifiable user community providing at least one media sub-element selected from a group of sub-elements including, local network, ad length, total spots, dates, daypart rating, number of placements, and percent proposal sponsor message;

calculating a cost per spot proposal value determined from the equation

Average Market Cost Per Point (CPP)×Daypart Rating=Cost Per Spot (CPS); and, calculating a TV value proposal determined from the equation;

TV Value=(Number of Spots×CPS)×% Message.

14. A computer based method for automated submission and evaluation of business proposals comprising the steps of:

(a) providing a database mutually accessible to a commercial airline proposal sponsor and at least one requesting user community;

(b) communicating with a uniquely identifiable user community and interactively requesting one or more media or promotional elements for evaluation;

(c) recognizing and accepting from a uniquely identifiable user community one or more media and promotional elements for evaluation;

(d) populating said database with a first set of proposal values when identified by a uniquely identifiable user community, said proposal first set values selected from a group of proposed media elements, including newspaper, magazine, television, radio, out of home media and online advertising elements;

(e) populating said database with a second set of proposal elements when identified by a uniquely identifiable user community, said proposal second set values selected from a group of proposed promotional elements including out of home media, program events, direct marketing, event giveaways, event tickets and entertainment elements;

(f) calculating a proposal sponsor payment value based upon populated media elements of (d) and populated promotional elements of (e) according to schema provided by a proposal sponsor;

(g) comparing the calculated entity payment value of (f) with at least one proposal recommendation threshold value;

(h) associating the comparison result of (g) with a decision conclusion selected from one of a group of conclusions including, recommended, not recommended, and additional information required;

(i) populating, by a processor, the database of (a) with the decision conclusion derived in (h).

15. The method of claim 14 wherein the database population of claim 14(i) occurs within a second database exclusive of the database claimed in 14(a).

16. The method of claim 14 further comprising communicating the association result of 14(h) with at least one proposal sponsor.

17. The method of claim 14 further comprising communicating the association result of 14(h) with at least one requesting user community.

18. The method of claim 14 further comprising communicating the association result of 14(h) with at least one requesting user community and at least one proposal sponsor.

19. The method of claim 14 wherein the media element identified in claim 14(d) is television and further comprises a uniquely identifiable user community providing at least one media sub-element selected from a group of sub-elements including, local network, ad length, total spots, dates, daypart rating, number of placements, and percent proposal sponsor message;

calculating a cost per spot proposal value determined from the equation

Average Market Cost Per Point (CPP)×Daypart Rating=Cost Per Spot (CPS); and, calculating a TV value proposal determined from the equation;

TV Value=(Number of Spots×CPS)×% Message.

* * * * *